United States Patent [19]

Liao

[11] Patent Number: 5,073,103

[45] Date of Patent: Dec. 17, 1991

[54] INTEGRAL SLIDING MEMBER OF A SLIDE FASTENER AND THE MOLDING DEVICE THEREOF

[75] Inventor: Ching-Fu Liao, Taipei, Taiwan

[73] Assignee: Hseng Chee Enterprise PTE, Ltd, Taipei Hsien, Taiwan

[21] Appl. No.: 590,907

[22] Filed: Oct. 1, 1990

[51] Int. Cl.$^5$ .................. B29C 45/16; B29C 33/44; B29C 41/42

[52] U.S. Cl. ..................... 425/545; 164/342; 249/142; 264/242; 425/814; 425/DIG. 34

[58] Field of Search ........ 425/814, DIG. 5, DIG. 34, 425/545; 264/242; 249/160, 142; 164/342

[56] References Cited

U.S. PATENT DOCUMENTS

| | | | |
|---|---|---|---|
| 2,181,142 | 11/1939 | Marinsky | 425/814 |
| 2,209,413 | 7/1940 | Marinsky | 249/142 |
| 2,487,359 | 11/1949 | Natzler | 164/342 |
| 2,495,539 | 1/1950 | Natzler et al. | 164/342 |
| 2,519,171 | 8/1950 | Bolton | 249/160 |
| 2,672,662 | 3/1954 | Morin | 425/DIG. 34 |
| 2,705,345 | 4/1955 | Epple | 425/814 |
| 2,736,062 | 2/1956 | Scheuermann et al. | 249/142 |
| 4,790,973 | 12/1988 | Minami et al. | 264/242 |
| 5,013,511 | 5/1991 | Akashi | 425/DIG. 34 |

FOREIGN PATENT DOCUMENTS

| | | | |
|---|---|---|---|
| 545318 | 8/1957 | Canada | 264/242 |
| 718339 | 9/1965 | Canada | 264/242 |

Primary Examiner—Willard Hoag
Attorney, Agent, or Firm—Morrison Law Firm

[57] ABSTRACT

A molding device for molding a sliding member of a slide fastener includes a first mold, a second mold movable toward or away from the first mold to close or open the molding device, at least one set of upper movable moving parts, a first upper stationary molding part detachably fixed to the first mold and a second upper stationary molding part detachably fixed to the second mold. The upper stationary molding parts are replaceable to alter the design of the holding end of a pulling tab of the slide fastener. Each set of the upper movable molding parts includes a first and a second upper movable molding part installed in the first mold, a third and a fourth upper movable molding part in the second mold. Each of the four upper movable molding parts is guided to move in a direction slanted with respect to the direction of relative movement between the first and second molds, whereby the four upper movable molding parts are moved away from one another after the molding is completed to facilitate the separation of the molded member from the molding device. Each of the four upper molding parts includes a pair of independent and chain-linking sub-cavities which, when all of the four upper movable moving parts are brought together, combine with all other sub-cavity pairs to form two independent but chain-linked cavities for molding a pair of independent but chain-linking ring-shaped portion and pulling ring for the sliding member.

1 Claim, 13 Drawing Sheets

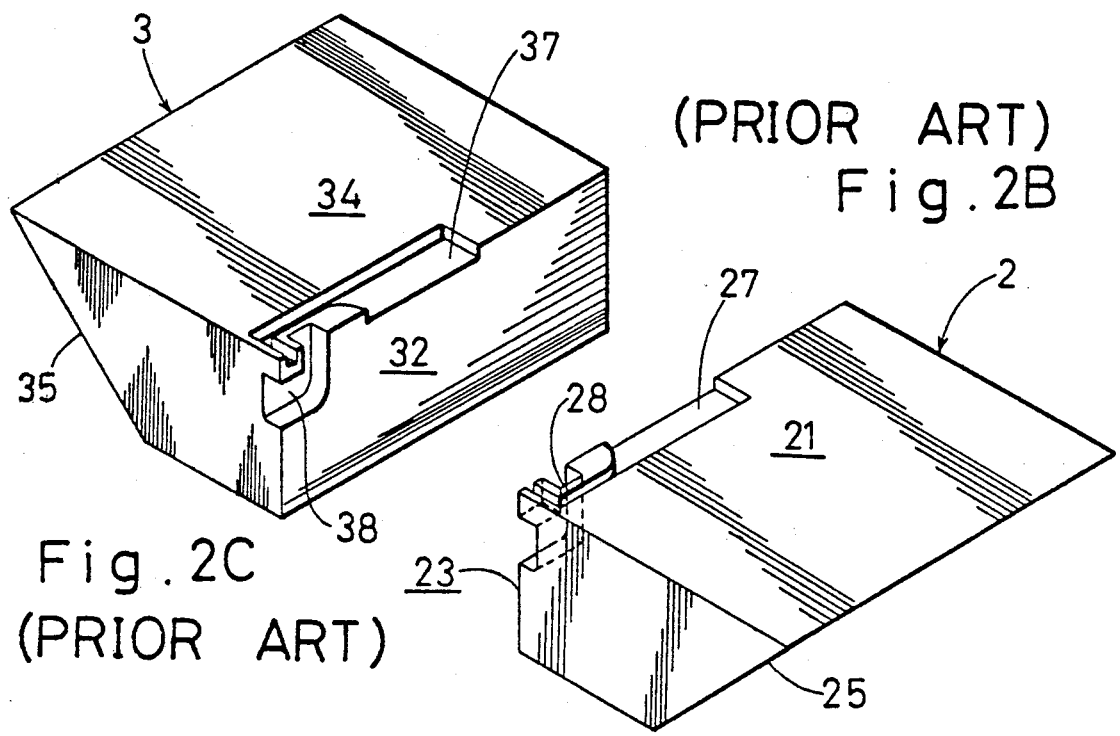
(PRIOR ART)
Fig. 2B
Fig. 2C
(PRIOR ART)
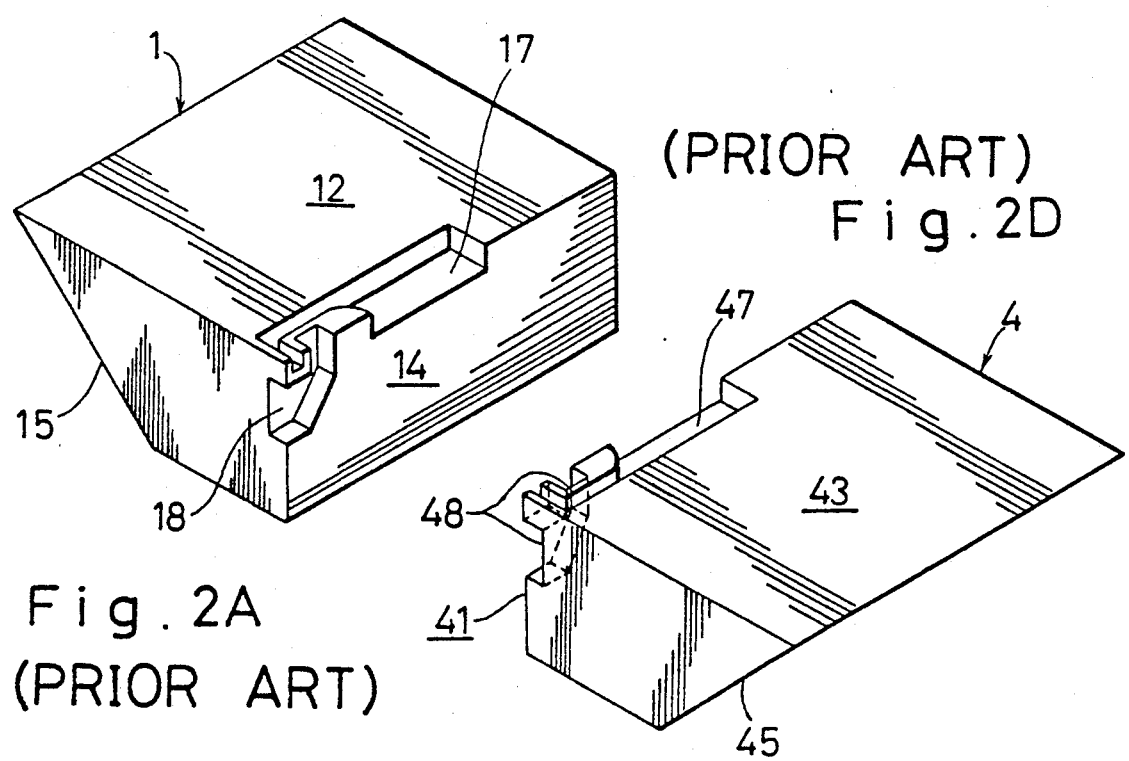
(PRIOR ART)
Fig. 2D
Fig. 2A
(PRIOR ART)

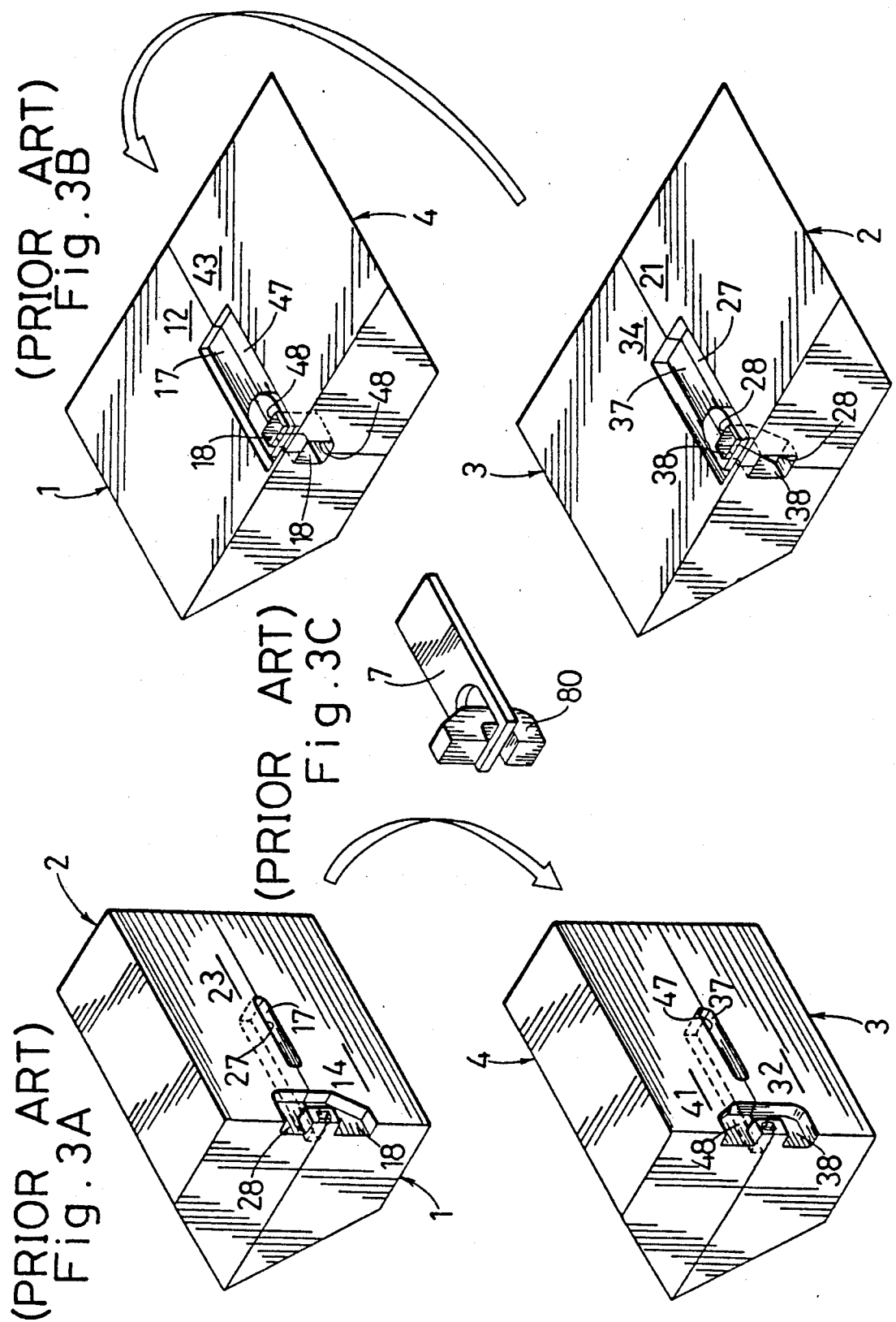

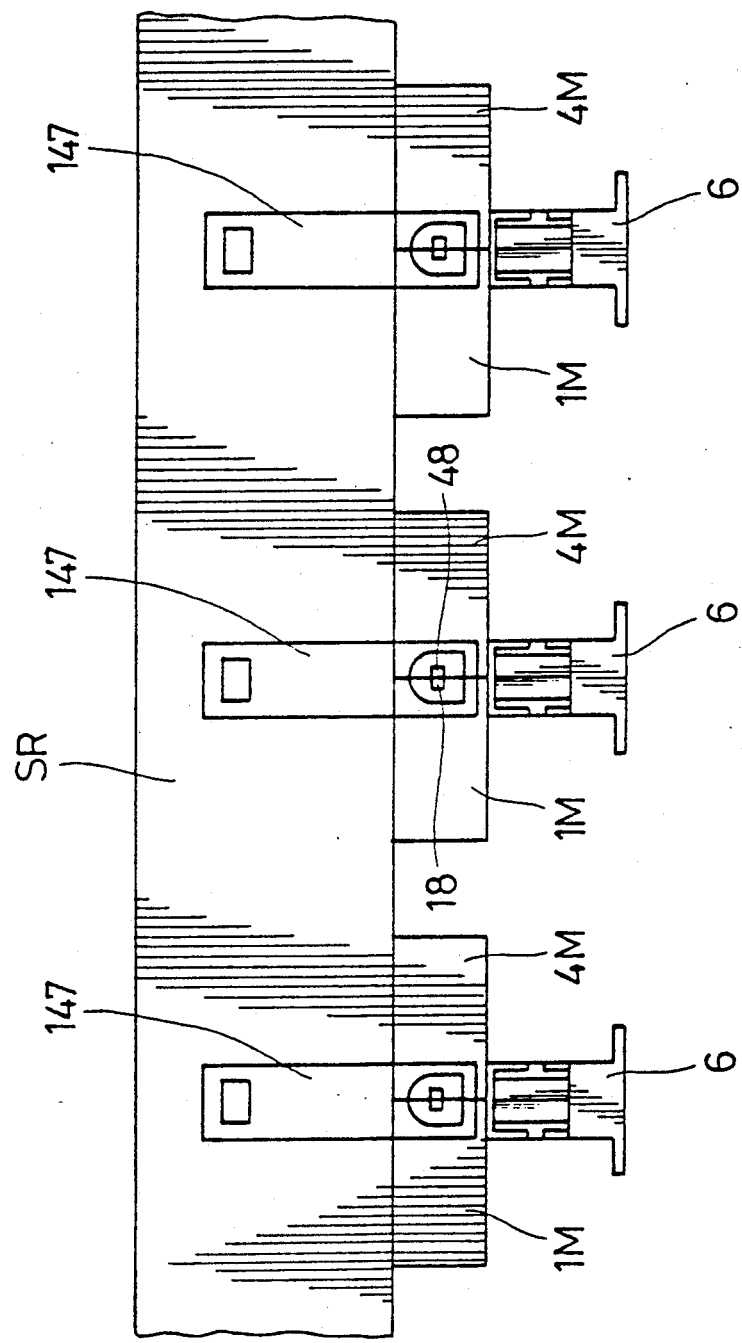

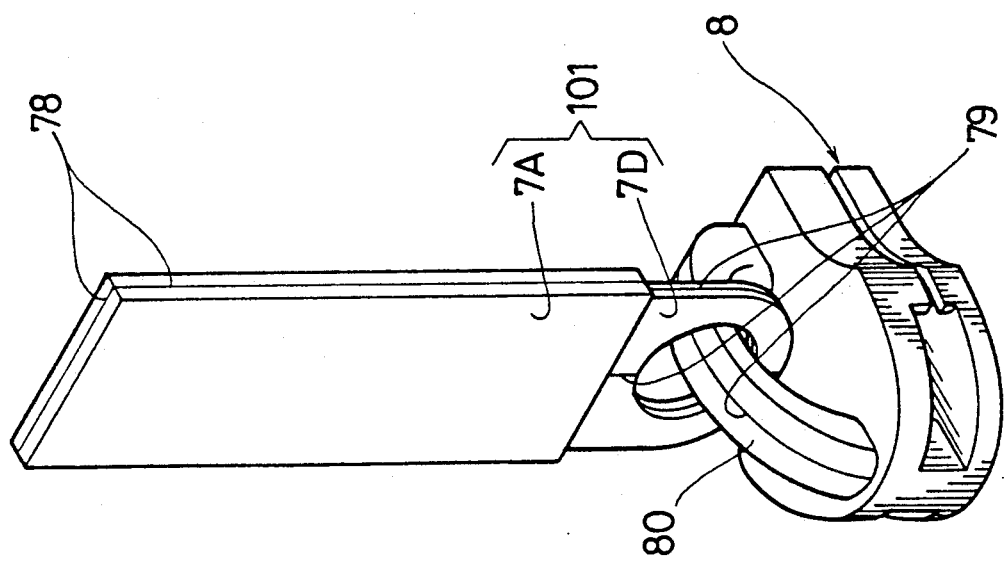
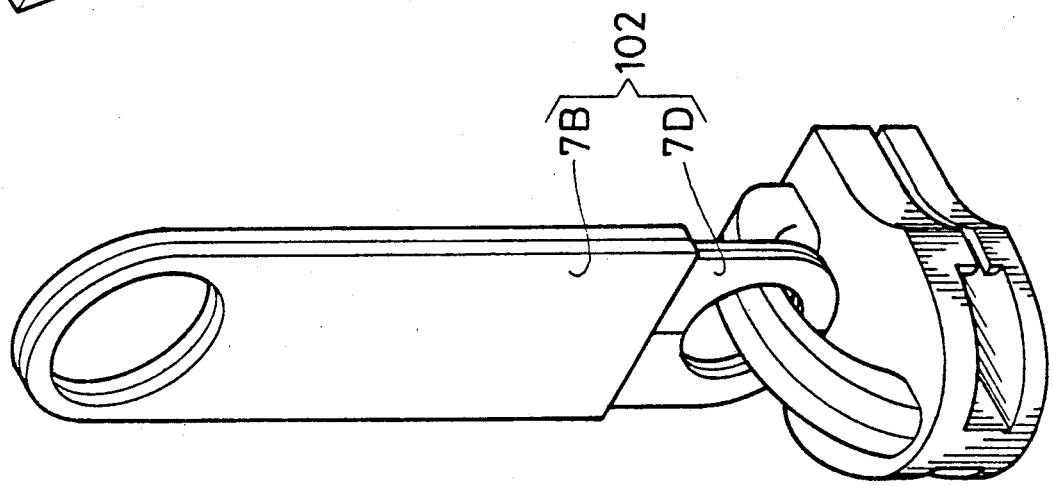
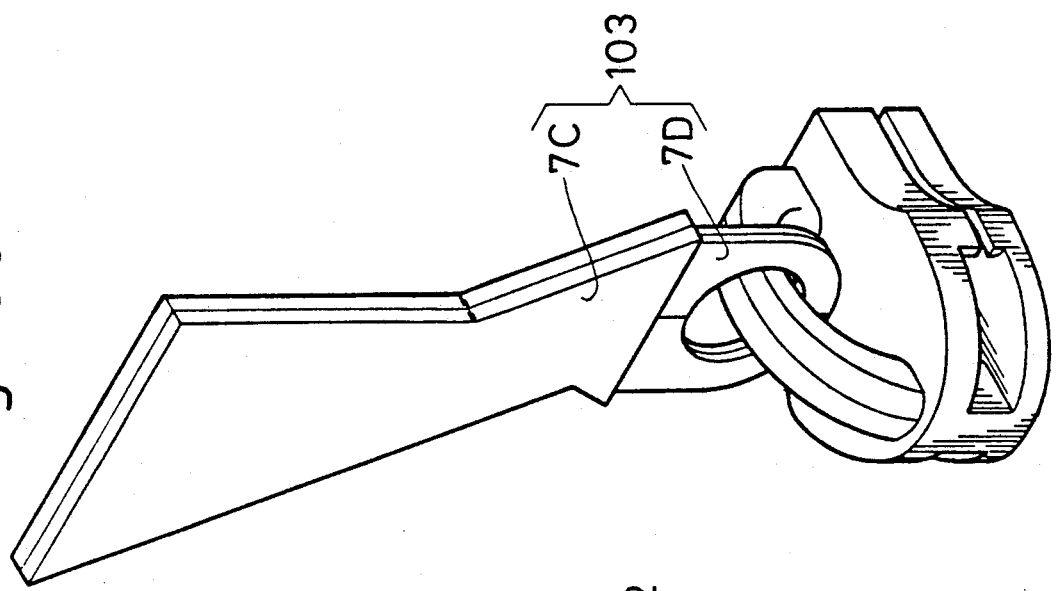

INTEGRAL SLIDING MEMBER OF A SLIDE FASTENER AND THE MOLDING DEVICE THEREOF

BACKGROUND OF THE INVENTION

This invention relates to an integral sliding member of a slide fastener and the molding device thereof.

Hitherto, sliding members of slide fasteners have been produced by separately forming a pulling tab and a slide, by injection molding, and than manually assembling the pulling tab to the slide by chain-linking a ring-shaped portion of the pulling tab with a pulling ring integrally formed on the slide. The term "chain-linking" referred herein and hereafter means to link two ring-shaped (or partially ring-shaped) members in a manner similar to the linking way of two consecutive rings in a chain. A slit is always provided in the pulling ring so that the ring-shaped portion of the pulling tab can be put into the pulling ring therethrough, and thereafter the slit must be closed so as to prevent separation of the pulling tab from the pulling ring (or the slide).

The above-described conventional method for producing a slide fastener is both time-consuming and costly due to the fact that is comprises four steps including forming a pulling tab, forming a slide, assembling the pulling tab to the slide, and then manually closing the slit provided on the pulling ring. In addition, the manual slit closing operation also hinders automation of the production procedure.

In order to solve the above problems, in Japan Utility Model laid-open No. Hei 2-19216 and also, equivalently, in U.K. patent publication No. 2220608 (hereinunder referred to as the prior application), the inventor proposed an integral sliding member of a slide fastener which is formed in a single stroke by injection molding and which does not include slit in either the pulling ring or the ring-shaped protion of the pulling tab. The technical content of the prior application will now be described with reference to FIGS. 1A through 10.

FIG. 1A is a perspective view of the sliding member of a slide fastener as disclosed in the afore-mentioned prior application, and FIG. 1B is the top view of the same sliding member in a slightly reduced scale. The whole sliding member is integrally formed in a production stroke by injection molding and comprises a pulling tab 7 and a slide 8 including a slide body 85 and a pulling ring 80 integrally formed on the upper surface of the slide body 85 with no slit existing in the pulling ring 80 or at the junctures of the pulling ring 80 to the slide body 85. An opening 75 is provided at the lower portion of the pulling tab 7 so as to form, around the opening 75, a ring-shaped portion including the lower edge 76 of the pulling tab 7. Also, a ring-shaped portion is formed around an opening 90 provided between the pulling ring 80 and upper surface of the slide body 85. The two ring-shaped portions are in a chain-linking relationship, namely the lower edge 76 of the pulling tab 7 extends through the opening 90 and the pulling ring 80 extends through the opening 75. This integral slide can be produced by the use of a set of molding device (see FIGS. 6 and 8A) mainly comprising a left mold L; a right mold R; four upper movable molding parts 1, 2, 3 and 4 (see also FIGS. 2A through 2D), among which the upper movable molding parts 2 and 3 are movably provided in the left mold L and the upper movable molding parts 1 and 4 are movably provided in the right mold R; and two lower molding parts 5 and 6 (see also FIGS. 4A and 4B) moveably provided in the left mold L and the right mold R, respectively.

As is best shown in FIG. 1B, the portion of the slide over the upper surface of the slide body 85 can be divided into four regions I, II, III and IV by two planes SS and TT. The pulling tab 7 comprises four portions 71, 72, 73 and 74, respectively in regions I, II, III and IV. While the pulling ring 80 comprises four portions 81, 82, 83 and 84, respectively in regions I, II, III and IV. Since the pulling tab 7 and the pulling ring 80 are in chain-linking relationship, further reduction of the number of required upper movable molding parts to less than four will cause the problem of separating the produced slide from the molding device. Namely, the molded sliding member will hinder the withdrawal of the upper movable molding parts or same withdrawal will hurt the produced fastener. Consequently, at least four upper movable molding parts are required for the production of the sliding member of a slide fastener of the prior application.

FIGS. 2A through 2D show the constructions of the four upper movable molding parts 1, 2, 3 and 4 each provided therein with sub-cavities for forming a portion of the sliding member, respectively, in the above-described regions I, II, III and IV. In order to clearly illustrate the construction of the sub-cavities, runners for introducing the constituting material of a slide into the cavities and guide holes for guiding an ejector rod have been omitted.

As shown in FIG. 2A, the first movable upper molding part 1 is provided therein with a pair of independent or noncommunicative sub-cavities (17, 18) for forming the above-mentioned two portions (71, 81). Similarly, as shown in FIGS. 2B, 2C and 2D, the second, third and fourth upper movable molding parts 2, 3 and 4 are provided therein, respectively, with a pair of independent sub-cavities (27, 28), (37, 38) and (47, 48), respectively, for forming the portions (72, 82), (73, 83) and (74, 84). Prior to the production of a sliding member by utilizing this molding device, the four upper movable molding parts 1, 2, 3 and 4 must be brought together into the position as shown in FIG. 6. In this position, the first upper movable molding part 1 is adjacent to the second upper movable molding part 2 on a surface 12, and to the fourth upper movable molding part 4 on a surface 14. Similarly, the second upper movable molding part 2 comprises two surfaces 21 and 23 which are adjacent to the first and the third upper movable molding parts 1 and 3, respectively, in the same state. The third upper movable molding part 3 comprises two surfaces 32 and 34, and the fourth upper movable molding part 4 comprises two surfaces 41 and 43. In addition to the above-described adjacent surfaces, each of the four upper movable molding parts 1, 2, 3 and 4 also comprises a guide surface 15, 25, 35 or 45. As can be seen from FIG. 2A, the guide surface 15 of the first upper movable molding part 1 is slant with respect to the surface 14 for a reason to be described later, and the situation for the guide surfaces 25, 35 and 45 is the same.

FIG. 3A is a perspective view showing how the four upper movable molding parts as shown in FIG. 2A through 2D are brought together to form two independent but chain-linking molding cavities. As can be seen from FIG. 3A, when the third and the fourth upper movable molding part 3 and 4 are brought together with their surfaces 34 and 43 abutting against each other, the sub-cavities 37 and 38 overlap, respectively, with the cavities 47 and 48 so as to form two independent sub-cavities corresponding the left half of the portion of a slide as shown in FIG. 3C. Likewise, when the first and the second upper movable molding parts 1 and 2 are brought together in a similar manner, two independent sub-cavities corresponding to the residual half of the same portion are formed. Then, when the first, the second upper movable molding parts 1, 2 and the third, the fourth upper movable molding parts 3, 4 are further put together with the surfaces 14 and 23 overlapping with the corresponding surfaces 41 and 32, two independent and chain-linking cavities corresponding to the whole pulling tab 7 and the pulling ring 80 of a sliding member as shown in FIG. 3C will be formed. FIG. 3B is similar to FIG. 3A, but shows the sub-cavities 17, 27, 37 and 47 for the pulling tab 7 in a more clear manner.

FIG. 4A shows the structure of a lower molding part 5 to be provided in a left mold, FIG. 4B shows the structure of another lower molding part 6 to be provided in a right mold. FIG. 5A is a perspective view showing the position when the two lower molding parts as shown in FIGS. 4A and 4B are brought together. FIG. 5B is the perspective view of the residual portion of a slide except for the portion shown in FIG. 3C. And FIG. 6 is a perspective view showing a state in which the six molding parts as shown in FIGS. 2A through 2D and FIGS. 4A and 4B are brought together for the molding of a slide.

When the two lower molding parts 5 and 6 are brought together with the above-described four upper movable molding parts 1, 2, 3 and 4 within the left mold L and right mold R to become the relationship as shown in FIG. 6, the top surfaces 51 and 61 of the two lower molding parts 5 and 6 contact with the bottom surfaces of the upper molding parts. The lower molding part 6 comprises a base portion 60 and an extension 62 extending from one side of the lower molding part 6 opposite the lower molding part 5 toward the latter. The extension 62 includes a V-shaped concave portion 63 formed at the free end thereof; a top surface 66 lower than the top surface 61 of the base portion 60 by a height difference equal to the thickness of the top plate 86 of the slide body 85 (see FIG. 5B) so as to form a sub-cavity, together with the upper movable molding parts 1, 2, 3, 4 and the left and right molds, for forming a portion of the top plate 86; and a step-shaped portion 68 formed in the vicinity of the juncture of the extension 62 to the base portion 60 near the top surface 66 so as to form a sub-cavity, together with the right mold, for forming a portion 88 of the side plate of a slide (see also FIG. 5B). The lower molding part 5 comprises a base portion 50 and an extension 52 extending from one side of the molding part 5 opposite the lower molding part 6 toward the latter. The extension 52 includes a guide slot 55 opening toward the extension 62 so as to sandwich the extension 62 therein for guiding the movement of the lower molding part 6 toward or away from the lower molding part 5; a top surface 56 partially lower than the top surface 51 of the base portion 50 by a height difference equal to the thickness of the top plate 86 of the slide body 85 (see FIG. 5B) so as to form a sub-cavity, together with the upper molding parts 1, 2, 3, 4 and the left and right molds, for forming a portion of the top plate 86; and a step-shaped portion 57 formed at the free end of the extension 52 near the top surface 56 so as to form a sub-cavity, together with the right mold, for forming a portion 87 of the side plate of a sliding member (see also FIG. 5B). During the molding of the sliding member, when the extension 62 reaches a predetermined position for molding the sliding member as shown in FIG. 5A, no gap exists between the side edges of the extension 62 and of the guide slot 55, and a space 100 is formed between the V-shaped concave portion 63 of the extension 62 and the concave end surface 53 of the guide slot 55, with the top end and the bottom end of the space 100 being, respectively, bounded by the upper movable molding parts and the left mold (not shown in FIG. 5A) so as to form, during molding operation, a connecting portion 89 which connects the top plate 86 and the bottom plate 86' of the slide body 85. The bottom plate 86' and the side plate 87', 88' connected thereto can be formed by similar structures provided on the undersurfaces of the extensions 52 and 62. Consequently, the whole slide body 85 can be produced through the cooperation of the lower movable molding parts 5, 6 together with the upper molding parts 1, 2, 3, 4 and the left and right molds.

When the upper and lower molding parts 1 through 6 are brought together as shown in FIG. 6, the sub-cavities, 18, 28, 38 and 48 provided in the upper movable molding parts 1, 2, 3 and 4 (see also FIGS. 3A and 3B) for forming the pulling ring 80 (see FIG. 3C) come into positions connecting with the sub-cavities provided between the upper molding parts and the lower molding parts for forming the top plate 86 of the slide body 85 (see FIG. 5A) so as to cooperatively constitute a complete cavity (hereinunder referred to as second cavity) for forming a whole slide 8 inclusive of a slide body 85 and a pulling ring 80. As can be readily understood, the thus formed cavity for the whole slide 8 is in an independent but chain-linking relationship with a combined cavity (hereinunder referred to as first cavity) for the pulling tab 7 formed by the sub-cavities 17, 27, 37 and 47 as described above.

FIG. 7 is a front view showing the shape of the molded sliding member with some surplus material attached thereto. A whole sliding member can be produced within a single production stroke, when the material for injection molding is charged into the molding device through a sprue (not shown) and a main runner M and then is introduced into an upper branch runner U connecting with the first cavity and a lower branch runner V connecting with the second cavity. The extra materials connected with the sliding member can later be removed.

FIGS. 8A through 8C are top views showing the steps how the six molding parts 1, 2, 3, 4, 5, 6 and the left mold L and right mold R move relative to one another after a sliding member has been formed so as to separate the produced sliding member from the molding device. The upper movable molding parts 2, 3 and the lower molding part 5 are installed in the left mold L, and the upper movable molding parts 1, 4 and the lower molding part 6 are installed in the right mold R. At first, the left mold L (together with the molding parts 2, 3 and 5) and the right mold R (together with the molding parts 1, 4 and 6) are moved away from each other along the opposite directions E and F, from the position of FIG. 8A into the position of FIG. 8B. Then, under the action of compressed springs (not shown) provided along the guide surfaces 25 and 35 of the upper molding parts 2 and 3, the upper movable molding parts 2 and 3, respectively, move relative to the left mold L along the directions B and C so as to separate from each other by a small gap. The upper movable molding parts 1 and 4 move at the same time in a similar manner along the directions A and D. Consequently, the whole molding device comes into the position shown in FIG. 8C, and the produced sliding member is ready for being separated from the molding device by the use of an ejector rod. Though, for purpose of illustration, the movements of the comprising members of the molding device have been divided into two steps, the movements along the directions E, F and the movements along the directions A, B, C, D occur simultaneously.

Despite that the molding device and method for the sliding member of a slide fast fastener as described above does solve part of the problems occurring in conventional molding method, the inventor found that the prior application still suffers from some drawbacks. FIG. 9 is a perspective view illustrating part of the molding device in accordance with the prior application in which plural sets (only three sets are shown in the drawing) of upper movable molding parts 1 and 4 and lower molding part 6 are installed in a right mold R (not shown), and plural sets (only three sets are shown in the drawing) of upper movable molding parts 2 and 3 and lower molding part 5 are installed in a left mold L (not shown) for simultaneously molding a plurality of sliding member of slide fasteners by the molding device. FIG. 10 is a sectional view taken along X-X line in FIG. 9. As shown in FIGS. 9 and 10, during a mass production procedure, it is necessary to arrange plural sets of movable molding parts 1, 2, 3, 4, 5 and 6 within the molds L and R for simultaneously molding a plurality of sliding members (not shown in FIG. 9). However, due to the inertia of the upper movable molding parts 1, 2, 3 and 4 which are automatically moved relative to the mold L or R by springs or other proper resilient members installed within the molds when the right and left molds R and L are separated, it is very difficult to achieve synchronous movements of all sets of upper movable molding parts 1, 2, 3 and 4. On the other hand, after the molds L and R are separated, a plurality of ejecting rods (not shown in the FIGS.), each corresponding to a set of molding parts, will simultaneously protrude into the molding cavities to eject the molded sliding members so as to remove the latter from the molding device. Due to the non-synchronous movements of the plural sets of movable molding parts, some molded sliding members will not be ejected at correct timing, and are thus left in the molding cavities or even deformed by the ejecting rods. Besides, the ejecting rods are apt to break if hit on the hard surfaces of the movable molding parts. These problems will adversely affect the automation of molding operation and increase the production cost of the sliding members.

In addition, according the prior application, when changes in the design of the pulling tab in the sliding member is required, all the movable moving parts 1, 2, 3 and 4 must be detached and then replaced with another group of movable moving parts. This is another severe disadvantage of the prior application because change in the design of the pulling tab is more frequently required than other portions of the sliding member, and also because replacement of all set of the movable molding parts, which are usually received within the molds in a rather complicated manner due to the necessity of movements, are not only time-consuming but also apt to cause damage of the movable molding parts or molds owing to unintentional collisions during replacement of the molding parts.

In view of the above-described drawbacks of the prior application, the primary object of this invention is to provide an improved molding device in which the upper movable molding parts are much smaller as compared the prior application and enable the synchronous movement of for all sets of movable molding molds, thus avoiding possible entrapment of molded sliding members within the molds and possible breakage of the ejecting rods.

Another object of this invention is to provide a molding device wherein the design of the pulling tab is decided by two stationary molding parts which have simple structure and are fixed to the molds, thus changes in the design of the pulling tab of the sliding member can be easily achieved by replacement of the stationary molding parts only without the need of replacing any movable molding parts.

Yet another object of this invention is to provide a molding device, including movable molding parts and stationary molding parts, by which the designs of the molded sliding member may be diversified at low cost through proper combinations of different groups of movable and stationary molding parts.

BRIEF DESCRIPTION OF THE DRAWINGS

This invention will be more fully understood with reference to the following detailed description and accompanying drawings.

FIG. 2A through 2D are, respectively, the perspective views of four upper movable molding part for molding the pulling tab and pulling ring of a sliding member of prior application;

FIG. 3A is a perspective view showing how the four upper movable molding part as shown in FIGS. 2A through 2D are brought together to form two independent but chain-linking molding cavities;

FIG. 3B is a view similar to FIG. 3A, with the molding cavities shown from a different direction;

FIG. 3C a perspective view showing the portion of the sliding member as shown in FIG. 1 which is formed by the four movable molding parts as shown in FIG. 3A or 3B;

FIG. 12 is a sectional view taken along the line XII—XII of FIG. 11; and

FIG. 13A, 13B and 13C are perspective views, respectively, showing three styles of molded sliding member which are different only in the designs of the holding ends of the pulling tab and may be molded with the same groups of movable molding parts.

DETAILED DESCRIPTION OF THE PREFERRED EMBODIMENT

Figure 1A:
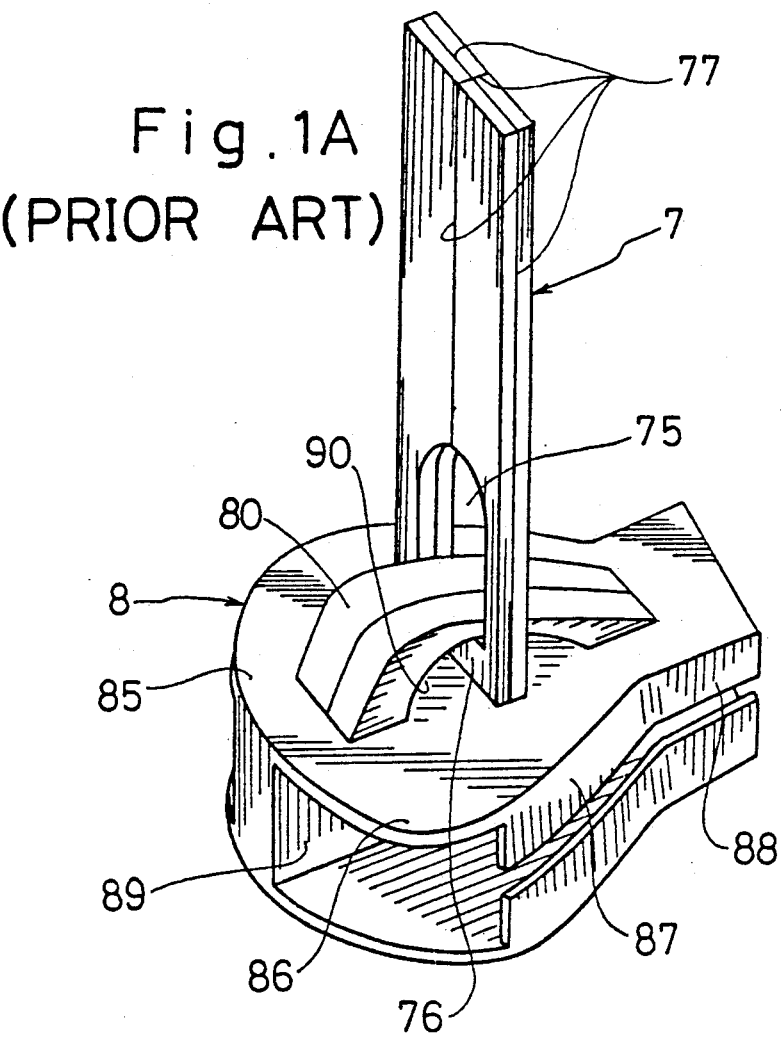
FIG. 1A is a perspective view of the sliding member of a slide fastener of the prior application.
Figure 1B:
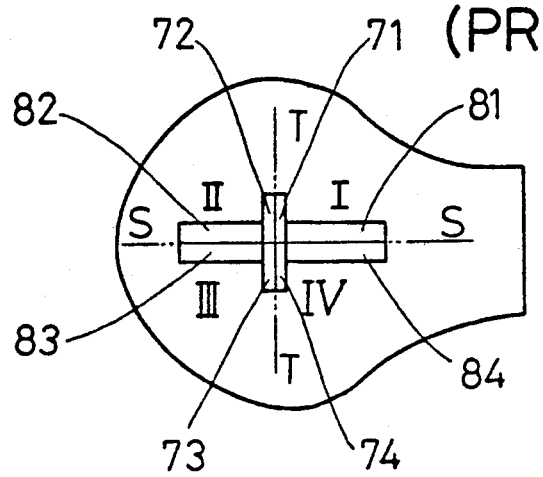
FIG. 1B is the top view of the sliding member as shown in FIG. 1A in a slightly reduced scale.
Figures 4A, 4B:
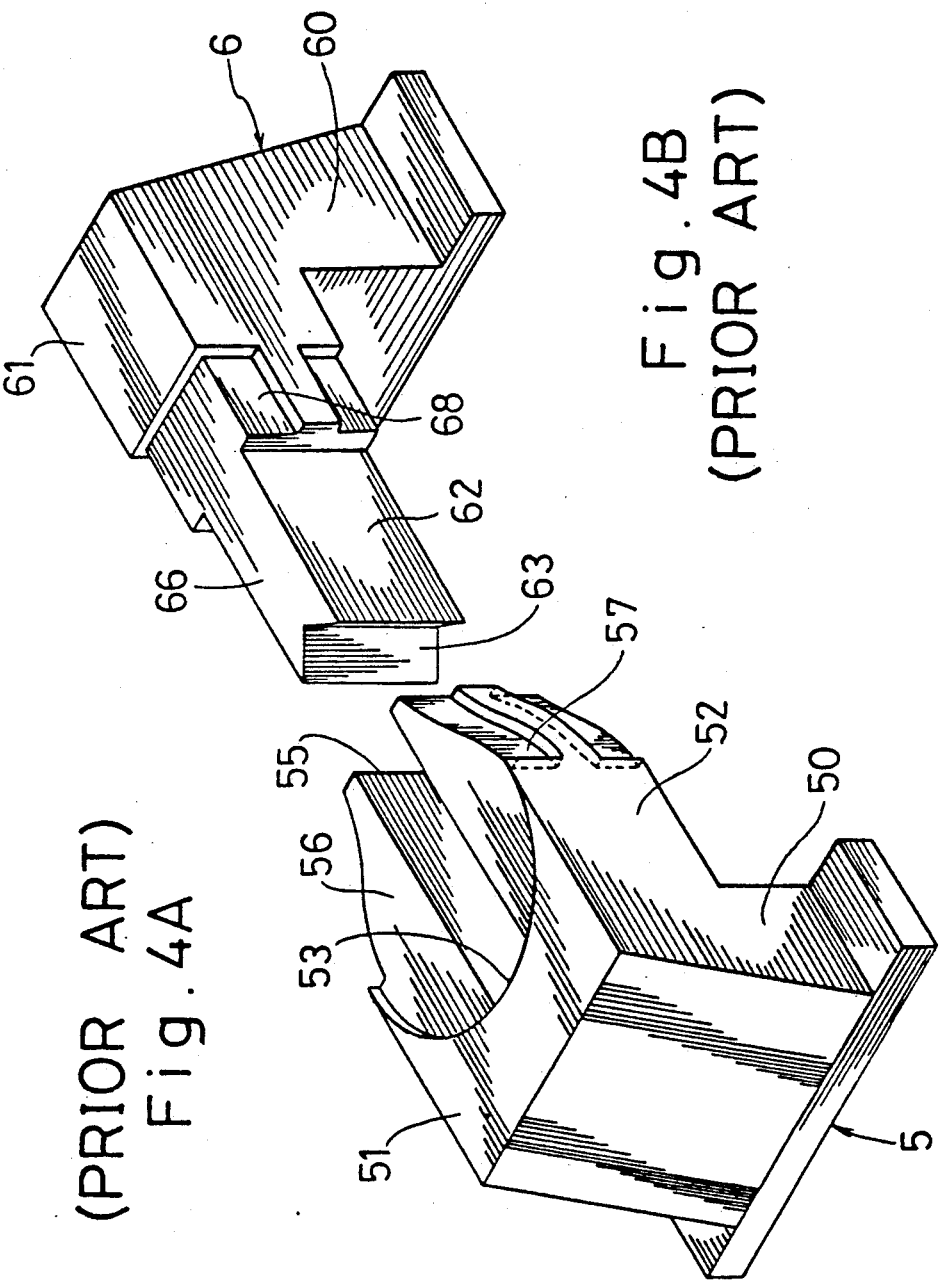
FIGS. 4A and 4B are, respectively, the perspective views of two lower molding parts for molding, in cooperation with a pair of left and right molds and the four upper movable molding parts shown in FIGS. 2A through 2D, the residual portion of a sliding member except that portion as shown in FIG. 3C.
Figure 5A:
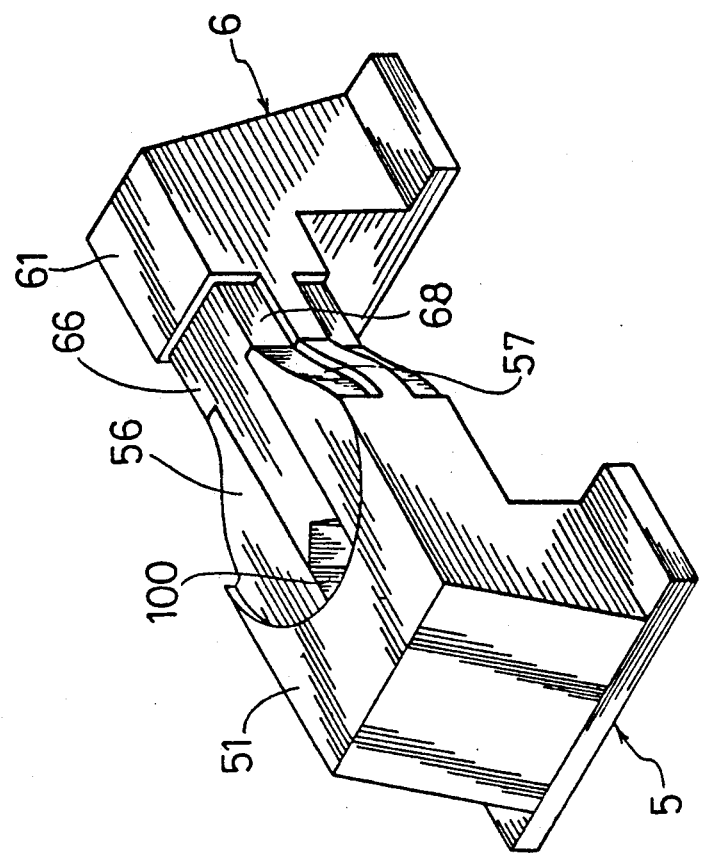
FIG. 5A is a perspective view showing the position when the two lower molding parts as shown in FIGS. 4A and 4B are brought together.
Figure 5B:
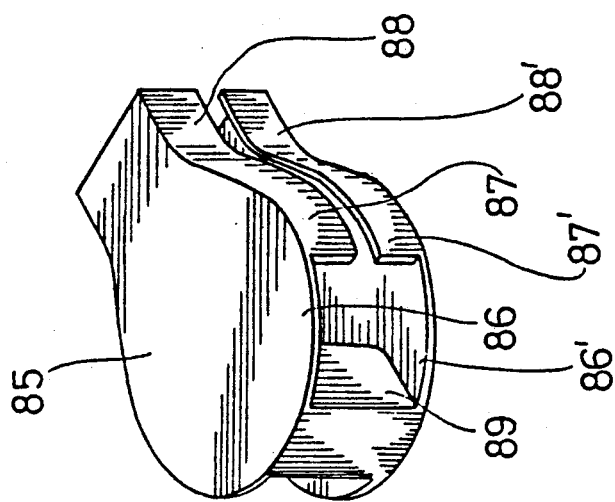
FIG. 5B is a perspective view of the residual portion of a sliding member except for the portion shown in FIG. 3C.
Figure 6:
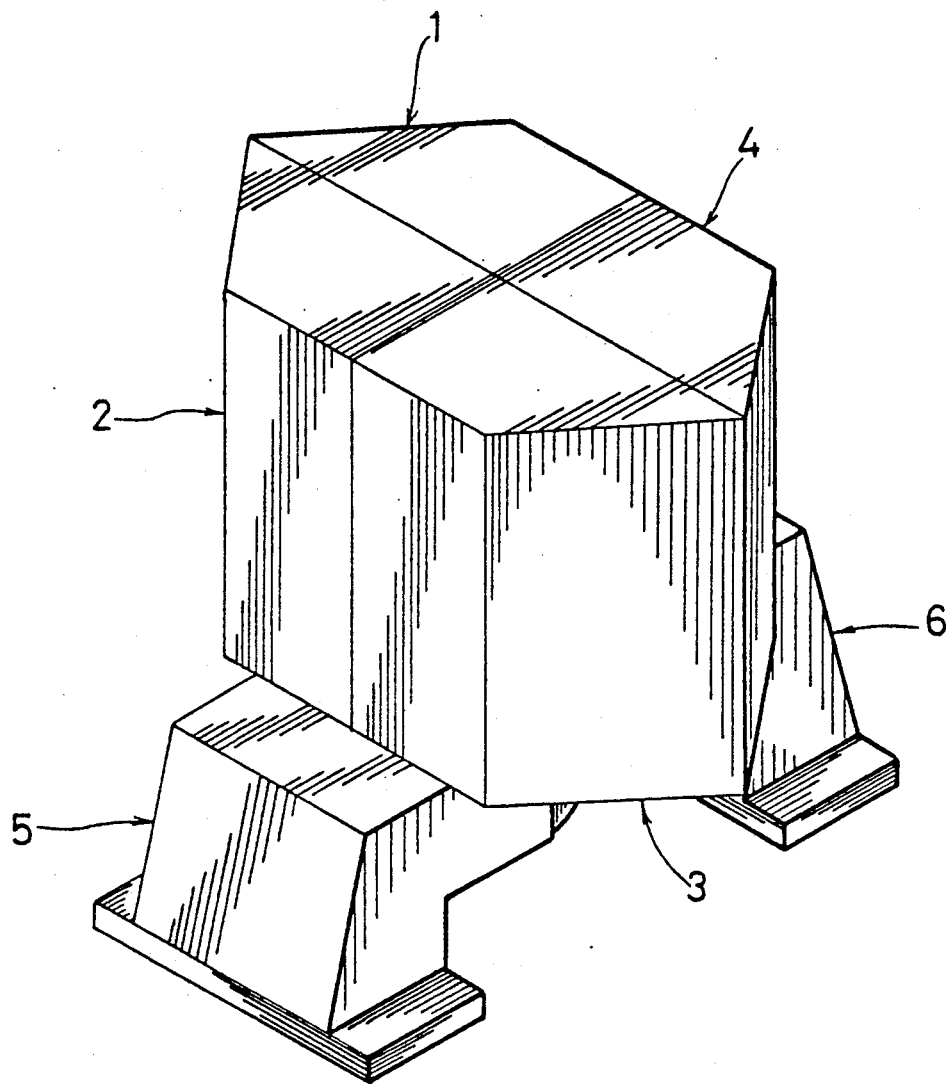
FIG. 6 is a perspective view showing the state in which the six molding parts as shown in FIGS. 2A through 2D and FIGS. 4A and 4B are brought together for the molding of a sliding member.
Figure 7:
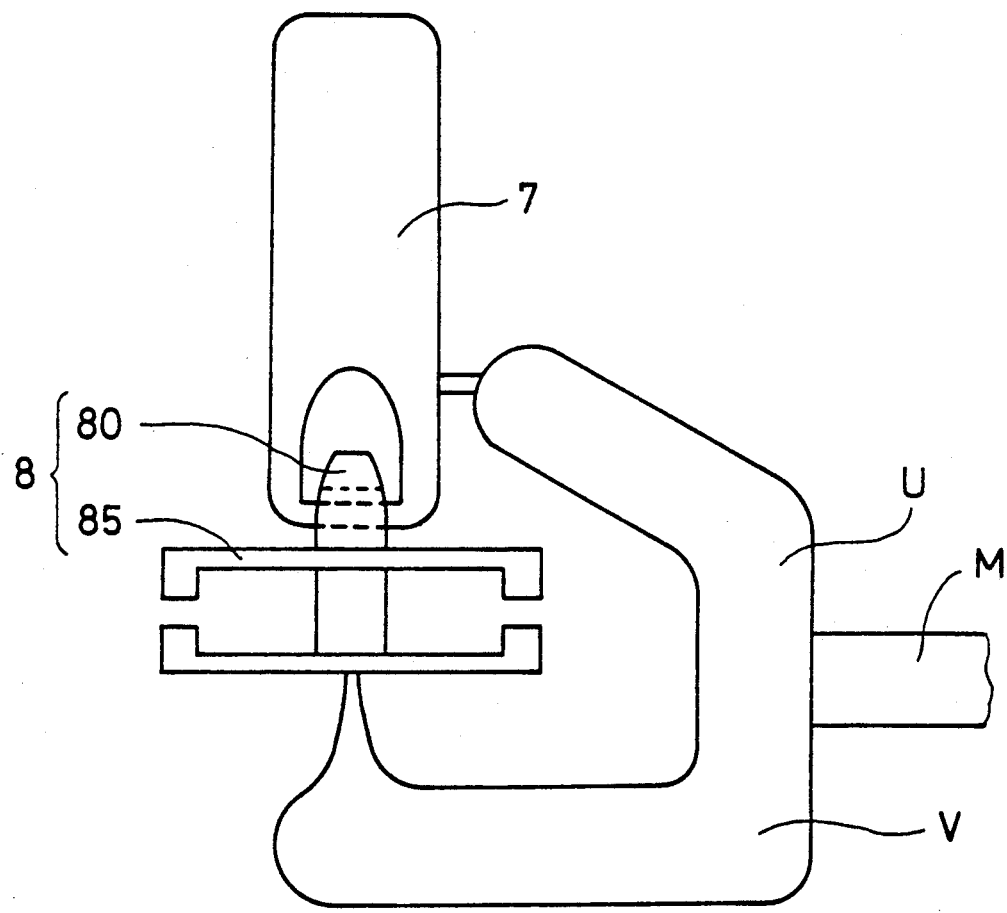
FIG. 7 is a front view showing the shape of the molded sliding member with some surplus materials attached thereto.
Figure 8A:
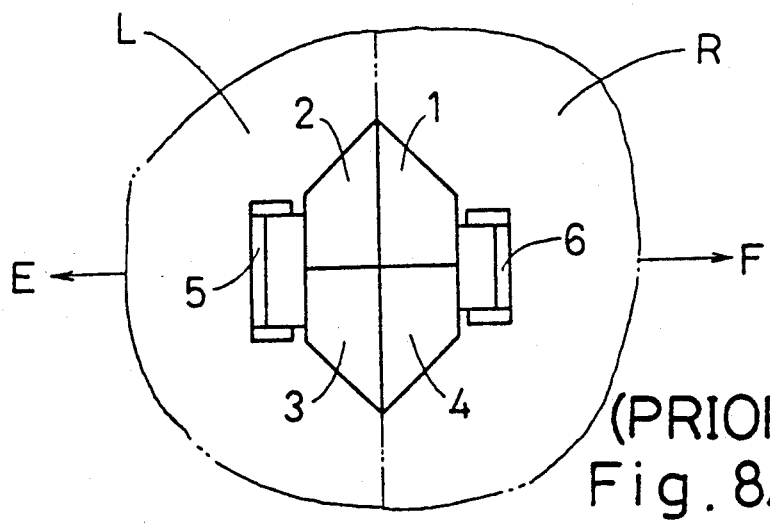
FIGS. 8A through 8C are top views showing the steps how the six molding parts shown in FIG. 6 separate from one another so as to release the molded sliding member.
Figure 8B:
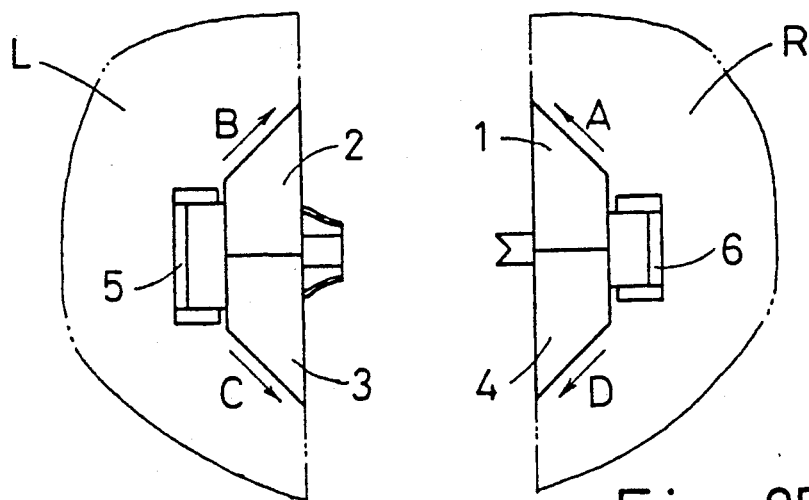
Figure 8C:
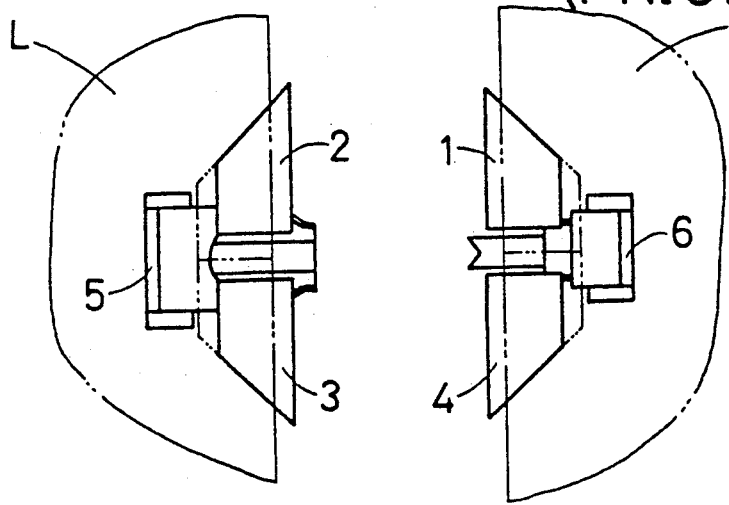

As can be understood by checking the parting lines 77 in FIG. 1 and also by referring to FIG. 3A through 3C, the whole pulling tab 7 of the sliding member in accordance with the prior application is molded by four movable molding parts 1, 2, 3 and 4. However, by comparing FIGS. 13A, 13B, 13C and 13D with FIG. 1, it can be found that the molded sliding members according to this invention are quite similar to that of prior application except slight difference in the structure of the pulling tabs 101, 102 and 103 of the molded sliding members. Taking the sliding member shown in FIG. 13A as an example and checking the parting lines 78 and 79 again, it is found that pulling tab 101 comprises a ring-shaped portion 7D molded by four movable molding parts in a similar manner as described above, and a holding end 7A molded by two stationary molding parts which are to be described in further detail later. Similarly, the sliding member shown in FIGS. 13B has substantially the same shape as FIG. 13A except that the pulling tab 102 comprises a ring-shaped portion 7D exactly identical to that included in pulling tab 101, and a holding end 7B having a design different from the holding end 7A of the pulling tab 101. Again, the sliding member shown in FIG. 13C has substantially the same shape as FIG. 13A except that the pulling tab 103 comprises a ring-shaped portion 7D exactly identical to that included in pulling tab 101, and a holding end 7C having a design different from the holding end 7A of the pulling tab 101.

Figure 10:
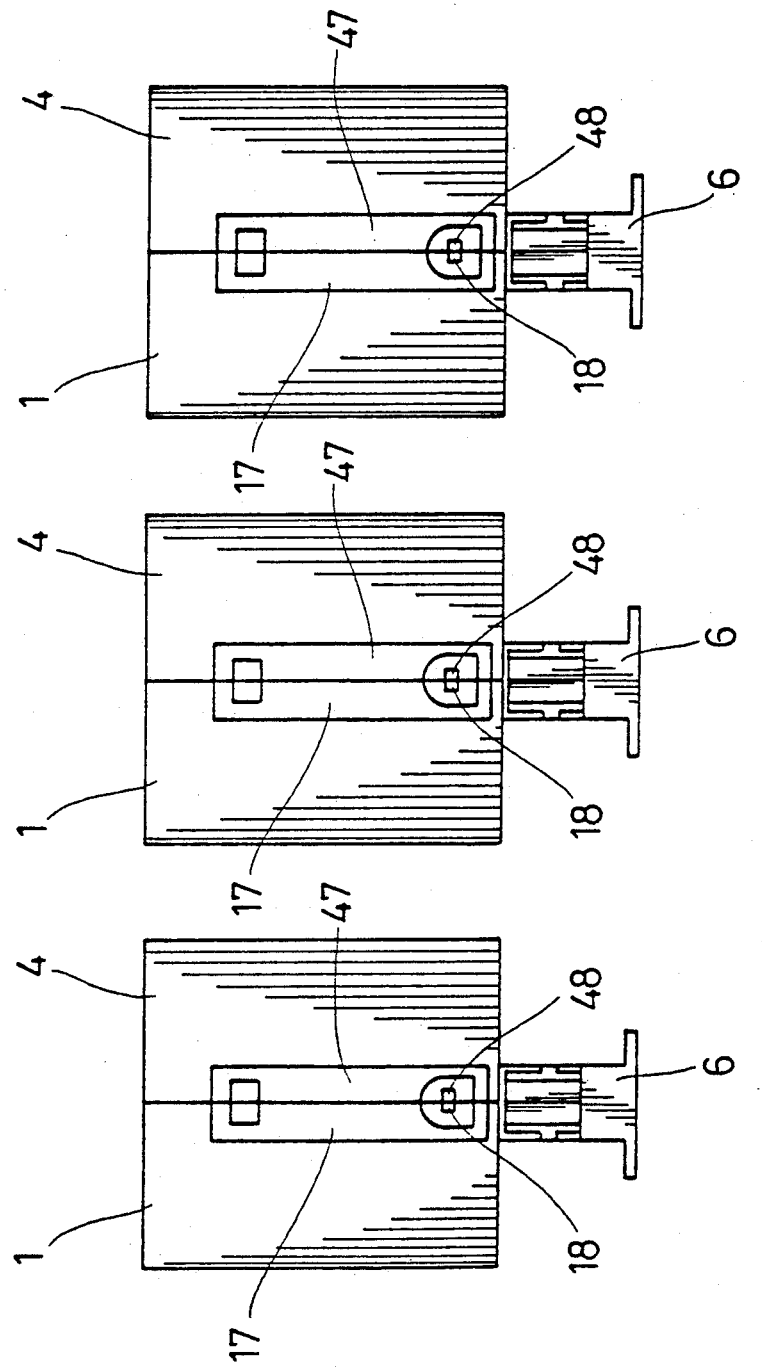
FIG. 10 is a sectional view taken along the line X—X of FIG. 9.
Figure 11:
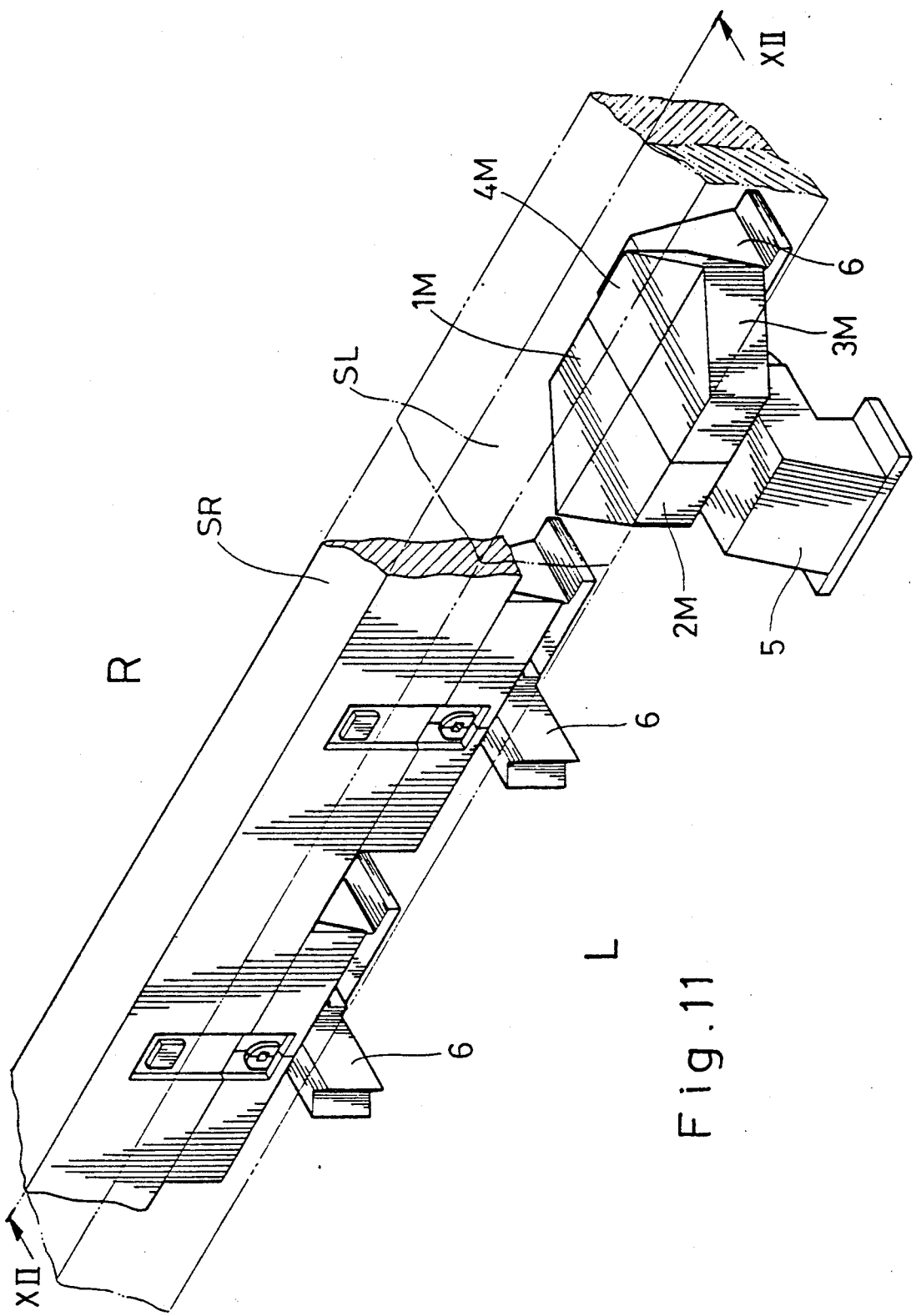
FIG. 11 is a perspective view illustrating part of the molding device in accordance with this invention in which plural sets of upper movable molding parts and lower molding parts (among which only three sets are fully or partially shown) and two upper stationary molding parts (one is partially shown by solid line, the other is partially shown by phantom line) are installed within two separable molds (not shown)

The molding device in accordance with this invention, partially shown in FIGS. 11 and 12, is similar to that of the prior application, partially shown in FIGS. 9 and 10, except for some differences to be described later. The molding device of this invention also comprises plural sets of molding parts among which only three sets are fully or partially illustrated in FIGS. 11 and 12. FIG. 11 shows three sets of upper movable molding parts 1M, 2M, 3M and 4M and lower molding parts 5, 6 (among which only one set is completely shown) and two upper stationary molding parts SL and SR (SR is partially shown by solid and phantom lines, and SL is partially shown by phantom line) installed within two separable molds (not shown). FIG. 12 only shows those movable and stationary molding parts installed within one of the two molds.

Figure 9:
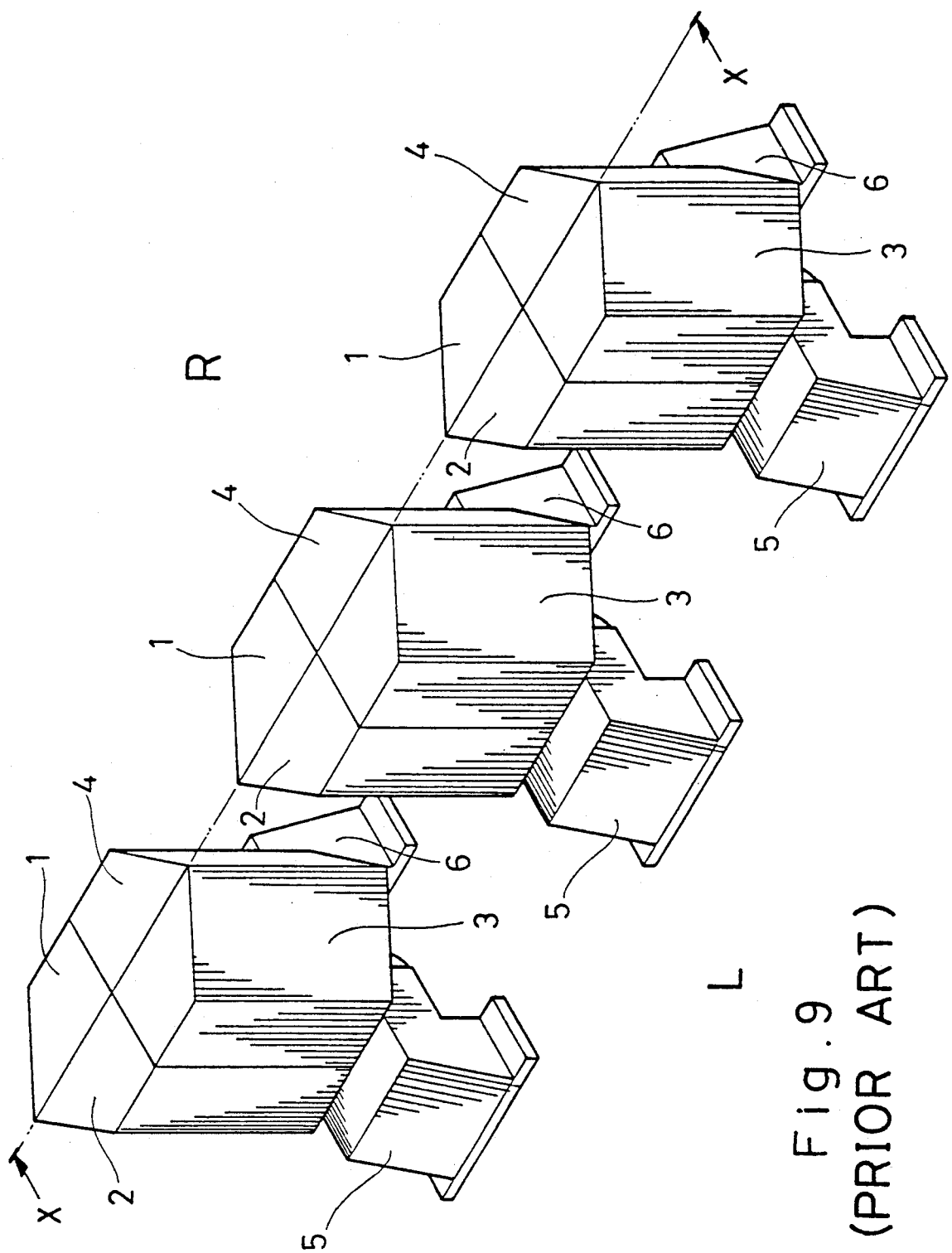
FIG. 9 is a perspective view illustrating part of the molding device of prior application in which plural sets of upper movable molding parts and lower molding parts (among which only three sets are shown) are installed within two separable molds (not shown)

Comparing FIGS. 11 and 12 with FIGS. 9 and 10, it can be seen that each set of movable molding parts in the molding device of this invention also comprises four upper movable molding parts 1M, 2M, 3M and 4M each of which is reduced to a thickness much thinner those upper movable molding parts 1, 2, 3 and 4 of prior application. Instead, a common upper stationary molding parts SR is fixed to a mold at the location of the reduced portions of all sets of upper movable molding parts 1M and 4M, and a common upper stationary molding parts SL is fixed to a mold at the location of the reduced portions of all sets of upper movable molding parts 2M and 3M. From FIGS. 12 and 13A, 13B, 13C, it can be understood that the two stationary molding parts SL and SR cooperate to mold the holding end 7A (or 7B, 7C), while the four movable molding parts 1M, 2M, 3M and 4M cooperate to mold the chain-linking ring-shaped portion 7D of pulling tab and pulling ring 80 of sliding member 8. Consequently, the above-described independent but chain-linking sub-cavities 18, 48 etc. must be provided within the four movable molding parts 1M, 2M, 3M and 4M, while the remaining sub-cavities are provided within the two stationary molding parts SR and SL. Thus, as shown in FIG. 12, a plurality of sub-cavities 147, each corresponding to one set of movable molding parts and being aligned with a pair of sub-cavities 18 and 48, are provided in the stationary molding parts SR to replace the original two sub-cavities 17 and 47 provided in the movable molding parts 1 and 4 of the prior application. Thus, the design change of pulling tab of sliding member from a style 7A (FIG. 13A) to another style 7B or 7C (FIGS. 13B and 13C) can be easily achieved through a simple operation of replacing two pieces of stationary molding parts SR and SL, instead of complicated operation of changing all sets of upper movable molding parts. Since the remaining construction of the molding device in accordance with this invention is identical to that of the afore-described prior application, the description thereof is omitted.

Consequently, in accordance with this invention, the much smaller size and thus the much lighter weight of the upper movable molding part as compared the prior application enables the synchronous movements for all sets of movable molding molds, thus avoiding possible entrapment of molded sliding members within the molds and possible breakage of the ejecting rods. Besides, since the stationary molding parts, which decide the design of the holding end or the pulling tab, can be easily fixed to or detached from the molds, changes in the design of the pulling tab of the sliding member can be easily achieved by replacement of the stationary molding parts only without the need of troublesome operation for replacing any movable molding parts. In addition, this invention makes it possible to diversify the design of sliding members at low cost through proper combinations of different groups of movable and stationary molding parts.

I claim:

1. A molding device for injection molding a sliding member of a slide fastener, comprising:
   a first mold;

a second mold movable toward and away from said first mold, thereby closing and opening said molding device;
at least one set of molding parts;
said at least one set of molding parts including:
a first upper movable molding part in said first mold;
a second upper movable molding part in said first mold;
a third upper movable molding part in said second mold;
a fourth upper movable molding part in said second mold;
said first, second, third and fourth upper molding parts being movable away from each other on completion of molding said sliding member;
each of said upper movable molding parts including first and second independent and chain-linking sub-cavities therein;
all of said first and second independent chain-linking sub-cavities in said first, second, third and fourth movable molding parts, when all four upper movable molding parts are brought together, fitting together to form first and second independent, but chain-linking cavities;
said first cavity being a first portion of a pulling tab said sliding member;
said second cavity being a ring-shaped portion of said sliding member;
said first portion of a pulling tab and said ring-shaped portion of said sliding member being independent and chain-linked;
each of said first, second, third and fourth upper movable molding parts including a surface which is slanted with respect to a direction of relative movement between said first and second molds;
all of said surfaces being effective for guiding a movement of its respective upper movable molding part with respect one of said first and second molds;
a first lower molding part affixed to said first mold;
a second lower molding part affixed to said second mold for forming, together with said two molds and said upper movable molding parts, a slide body of said slide fastener;
a first upper stationary molding part detachably affixed to said first mold;
a second upper stationary molding part detachably affixed to said second mold;
at least one of said first and second upper stationary molding parts including a tab sub-cavity which, when said first and second upper stationary molding parts are brought together, form a cavity for a second portion of said pulling tab;
said tab sub-cavity communicating with said first cavity, when said mold is closed, whereby said second portion of said pulling tab is integrally molded with said first portion of said pulling tab; and
inclusion of said tab sub-cavity in said first and second upper stationary molding parts permitting easy change in shape of said second part, without disturbing a remainder of said molding apparatus.

* * * * *